United States Patent Office 3,067,172
Patented Dec. 4, 1962

3,067,172
METHOD FOR PRODUCING PHENOL ALDEHYDE RESINS
Borge Ingmar Carlstrom, Strandbaden, Sweden, assignor to Hoeganaes Development Co. Ltd., a company of Canada
No Drawing. Filed May 15, 1959, Ser. No. 813,369
6 Claims. (Cl. 260—60)

This invention relates to a new method for producing phenol-formaldehyde resins of the so-called resole type with improved properties.

Phenol-formaldehyde resins are prepared by the condensation of phenol and formaldehyde in the presence of alkalies. As a relatively high alkalinity is necessary caustic alkali is almost exclusively used in practice to get the required high hydroxyl concentration value. This, however, results in contamination of the resin with alkali metal which causes several inconveniences such as bad electrical properties and poor adhesion to mineral fibres. Even when it is attempted to neutralize the caustic alkali with acids it has been found to be practically impossible to avoid inconveniences, partly because the neutralization cannot be complete as the resins themselves are acid and partly owing to the difficulty of removing the neutral salts formed by the neutralization.

According to the invention the above mentioned problems are solved in such a way that the caustic alkali is used during the condensation step in order to make it as rapid and complete as possible, whereafter the alkali metal is exchanged for another less harmful cation. It has proved possible to filter the liquid condensed resin through a cation exchanger whereby the alkali metal ions are replaced by other cations.

According to the invention it is, for instance, possible to exchange the cations of the strong alkali metal hydroxides for hydrogen ions by filtering the resin through a hydrogen saturated cation exchanger. The alkali metal ions can also be exchanged for ammonium ions. Hereby the strong alkali metal hydroxides are replaced by the weaker ammonium hydroxide which substantially escapes as ammonia during the curing of the resin, or, if desired, can be removed by evaporation in vacuum.

If the resin is filtered through a cation exchanger saturated with hydrogen ions, the resin is precipitated in the cation exchanger partly owing to the diminution of the hydroxyl ion concentration and partly owing to the fact that the first part of the resin, which passes through the cation exchanger, is very much diluted by water. The most suitable method has been shown to be by filtering the resin through a cation exchanger saturated with ammonium ions. This makes it possible to supply the ion exchanger with ammonia before the resin is filtered through it. In this way the resin is prevented from precipitating in the ion exchanger owing to dilution with water, even in such cases where the resin has a high condensation degree. It has also been shown that if, in the method according to the invention an excess of the ion exchanger is used in proportion to the theoretical quantity, calculated on equivalent ion exchange material in proportion to equivalent alkali metal hydroxide which is to be exchanged, the ion exchanger can be rewashed with ammonia. It is true that some alkali metal ions are washed away from the upper layer of the ion exchanger but they will all stop again in the lower part of the ion exchanger column. A suitable excess, when using an ammonium saturated ion exchanger for filtering a resin with a high content of sodium hydroxide has been shown to be about 20 percent. Such a rewashing of the ion exchanger with ammonia in combination with a protecting layer of ammonia being introduced into the ion exchanger before filtering makes it possible to completely recover the resin which is filtered through the ion exchanger.

A suitable ion exchange material is one having the trade name "Nalcite HCR" which is a sulfonated co-polymer of styrene and divinylbenzene but in general any cation exchange material may be used.

The example below will give further explanation to the method. A water-soluble resin is produced from following raw materials:

16 kg. phenol
24 l. formaline (37%)
4 l. 2 N NaOH

The components react at 70° C. until the precipitation point is 3–5. This means that a sample neutralized to pH7 shall be able to be diluted with 3–5 parts of water, before precipitation begins. 5 liters of Nalcite HCR having a cation exchange capacity of 2 g.-equivalents per liter are saturated with ammonium ions from 10 liters of a 15 percent ammonium sulphate solution. The ion exchange material is washed with water and supplied with ½ liter of a 25% solution of ammonia in water and then the resin is filtered through the ion exchange material at a rate of 1 liter per minute. The resin is followed by ½ liter of a 25% solution of ammonia in water and then by 5 liters of water, which are collected with the filtered resin. The resin produced in this way has an ash content of 0.02 percent and an alkali metal content of 0.01 percent. It can be refined e.g. by further heating to a water-insoluble liquid resin practically free from alkali metal and ash.

Instead of the "Nalcite HCR" we have with equally good results used another cation exchanger on the basis of a sulfonated co-polymer of styrene and divinylbenzene, marketed under the name "Ajonit." Another ion exchange material, which is useful even if it has a lower exchange capacity (about 1 gram-equivalent per liter) is marketed under the name "Konvertat" which is made from sulfonated naphthalene reacted with formaldehyde to the water insoluble state. Even ion exchangers made from phenol sulfonic acids or sulfonated hydrocarbons are utilizable but less resistant or of such low capacity that they must be used in large quantities, which leads to large quantities of water for washing out remaining resins, thus simultaneously decreasing the concentration of the resin.

Phenol has been mentioned as the only example of the main component of the resin. Cresol, xylenols, naphthol as well as their derivatives may also be used alone or mixed.

This application is a continuation-in-part of my application Serial No. 556,800 filed January 3, 1956, and now abandoned.

I claim:

1. A method of producing a phenol-formaldehyde resin with a low content of ashes which comprises condensing a phenol and formaldehyde to the resole stage in the presence of an alkali metal hydroxide and removing alkali metal from the resulting resin solution by passing the same through a column of a cation exchange material which is insoluble in said solution and saturated with ammonium ions in exchanging position.

2. A method as claimed in claim 1, in which a water solution of ammonia is passed through the exchange filter before the resin solution.

3. A method as claimed in claim 1 in which the resin remaining in said column is washed out with an aqueous solution of ammonia.

4. A method as claimed in claim 3 in which said column contains a sufficient excess of ammonium ions to prevent the escape therefrom of alkali metal ions during said washing.

5. A method as defined in claim 1 in which the cation exchange material is a sulfonated copolymer of styrene and divinylbenzene.

6. A method as defined in claim 1 in which the cation exchange material is the water insoluble product of reaction of sulfonated naphthalene with formaldehyde.

References Cited in the file of this patent
UNITED STATES PATENTS
2,865,875    Hyman et al. _____ Dec. 23, 1958